(12) United States Patent
Schmitz (10) Patent No.: US 7,963,038 B2
(45) Date of Patent: Jun. 21, 2011

(54) TAB/SLOT JOINT AND METHOD

(75) Inventor: Chad D. Schmitz, Arlington, WA (US)

(73) Assignee: The Boeing Company, Chicago, IL (US)

( * ) Notice: Subject to any disclaimer, the term of this patent is extended or adjusted under 35 U.S.C. 154(b) by 864 days.

(21) Appl. No.: 11/727,762

(22) Filed: Mar. 28, 2007

(65) Prior Publication Data

US 2007/0289246 A1 Dec. 20, 2007

Related U.S. Application Data

(63) Continuation-in-part of application No. 11/424,246, filed on Jun. 15, 2006.

(51) Int. Cl.
| | |
|---|---|
| *B21D 39/03* | (2006.01) |
| *B21D 53/88* | (2006.01) |
| *B23Q 1/48* | (2006.01) |
| *B32B 3/04* | (2006.01) |
| *E04B 1/26* | (2006.01) |
| *E04B 2/00* | (2006.01) |

(52) U.S. Cl. ....... 29/897.2; 29/428; 52/590.2; 52/592.1; 403/364; 403/381; 428/121

(58) Field of Classification Search .................. 29/897.2; 52/590.2, 592.1, 782.1, 793.1; 403/428, 403/364, 381; 428/116, 121, 174, 192
See application file for complete search history.

(56) References Cited

U.S. PATENT DOCUMENTS

| | | | |
|---|---|---|---|
| 1,602,164 A | 10/1926 | Overbury | |
| 2,922,561 A | 1/1960 | Currivan | |
| 3,122,302 A | 2/1964 | Wood | |
| 3,341,908 A | 9/1967 | Lock | |
| 3,456,380 A | 7/1969 | Cameron | |
| 5,357,728 A | 10/1994 | Duncanson | |
| 5,652,039 A * | 7/1997 | Tremain et al. | 428/121 |
| 5,919,545 A * | 7/1999 | Giezendanner et al. | 428/116 |
| 5,940,935 A | 8/1999 | Julius | |
| 6,164,477 A | 12/2000 | Druckman et al. | |
| 6,251,497 B1 | 6/2001 | Hoopingarner | |
| 6,295,786 B1 * | 10/2001 | Lee | 52/745.19 |
| 6,325,568 B1 | 12/2001 | Druckman et al. | |
| 6,453,973 B1 * | 9/2002 | Russo | 160/135 |
| 6,685,085 B2 | 2/2004 | Hanna | |
| 6,797,364 B2 * | 9/2004 | Okada et al. | 428/174 |
| 6,948,651 B2 | 9/2005 | Ikeda | |
| 6,968,971 B2 | 11/2005 | Ely | |
| 7,013,535 B2 | 3/2006 | Tracy | |
| 7,188,456 B2 | 3/2007 | Knauseder | |
| 7,416,363 B2 * | 8/2008 | Kozhuev | 403/364 |
| 7,534,501 B2 | 5/2009 | Durney | |

* cited by examiner

*Primary Examiner* — David P Bryant
*Assistant Examiner* — Alexander P Taousakis

(57) ABSTRACT

To fabricate a joint in a panel, a groove is generated and the panel is bent along the groove. The panel includes a first skin, second skin, and core. The core is sandwiched between the first skin and the second skin. The groove passes through the first skin and at least a portion of the core. The groove includes a set of tabs and a corresponding set of slots. The set of tabs intermesh with the set of slots in response to bending the panel along the groove.

19 Claims, 12 Drawing Sheets

TAB/SLOT JOINT AND METHOD

CROSS REFERENCE TO RELATED APPLICATIONS

This application is a Continuation-in-Part of and claims priority to U.S. patent application Ser. No. 11/424,246, filed on Jun. 15, 2006, titled "INTERNAL FINGER JOINT," the disclosure of which is incorporated herein by reference in the entirety.

TECHNICAL FIELD

The present disclosure generally relates to a joint in a panel. More particularly, the disclosure pertains to a joint in a panel, and method of, fabricating the joint in the panel.

BACKGROUND

In a variety of industries, items are manufactured from sheet stock or panels. In general, a series of cuts and/or folds may be performed upon the sheet stock to generate joints. The cut joints typically require adhesives or fasteners to construct the item. Unfortunately, these glued or fastened joints may be physically weaker and/or have a less appealing appearance. In addition, the adhesives and fasteners may increase the weight and cost of the item. For some materials such as paperboard or cardboard, folded joints are relatively easy to generate and are therefore commonly utilized.

While folded joints are often preferred, for some relatively advanced materials such as rigid composite honeycomb panels, foam-core panels, and the like, folded or bent joints may be relatively more complicated to generate. For example, the sheet stock or panels utilized in some relatively high technology industries such as the aerospace industry, may be rather rigid as compared to paperboard and are generally routed with a groove and bent along this groove to form the folded joint. To reinforce the joint, adhesives are used to fill the groove prior to folding. Unfortunately, much like in cut joints, the adhesive in these glued or "ditch and pot" joints fill the joint and thus increase the weight and cost of the item.

Accordingly, it is desirable to provide a system, method and apparatus capable of overcoming the disadvantages described herein at least to some extent.

SUMMARY

The foregoing needs are met, to a great extent, by the present disclosure, wherein in one respect a system, apparatus, and method is provided that in some embodiments reduces the weight and/or expense of an item that includes a folded joint.

An embodiment relates to a method of fabricating a joint in a panel. In this method, a groove is generated and the panel is bent along the groove. The panel includes a first skin, second skin, and core. The core is sandwiched between the first skin and the second skin. The groove passes through the first skin and at least a portion of the core. The groove includes a set of tabs and a corresponding set of slots. The set of tabs intermesh with the set of slots in response to bending the panel along the groove.

Another embodiment pertains to a method of fabricating an item for an aerospace vehicle. In this method, a first joint is generated and a second joint is generated to substantially retain the angle of the first joint. To create the joint, a groove is fabricated and the panel is bent along the groove. The panel includes a first skin, second skin, and core. The core is sandwiched between the first skin and the second skin. The groove passes through the first skin and at least a portion of the core and delineates a first portion of the panel from a second portion of the panel. The groove includes a set of tabs and a corresponding set of slots. The panel is bent along the groove with the first portion and the second portion intersecting at an angle at the groove. The set of tabs intermesh with the set of slots in response to bending the panel along the groove.

Yet another embodiment relates to an aerospace vehicle component. The aerospace vehicle component include a panel and a joint. The panel includes a first skin, second skin, and core. The core is disposed between the first skin and the second skin. The joint includes a groove, set of tabs and set of slots. The groove is disposed across the panel. The groove passes through the first skin and at least a portion of the core. The groove delineates a first portion of the panel from a second portion of the panel. The set of tabs are disposed along the groove. Ones of the tabs alternate between a first side of the groove and a second side of the groove. The set of slots are disposed along the groove. Ones of the slots alternate between the second side of the groove and the first side of the groove. The first portion of the panel and the second portion of the panel intersect at an angle. The set of tabs and set of slots from the first side of the groove intermesh respectively with the set of slot and set of tabs from the second side of the groove.

Yet another embodiment pertains to a method of fabricating a joint in a panel. The panel includes a core sandwiched between a first skin and a second skin. In this method, a set of tabs and a corresponding set of slots are fabricated in the core, the set of tab are intermeshed with the corresponding set of slots to fabricate the joint, the first skin is affixed upon a first side of the core and the second skin is affixed upon a second side of the core.

There has thus been outlined, rather broadly, certain embodiments that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. In addition to the embodiments described, the various embodiments are capable of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the various embodiments.

DETAILED DESCRIPTION OF THE PREFERRED EMBODIMENT

Figure 1:
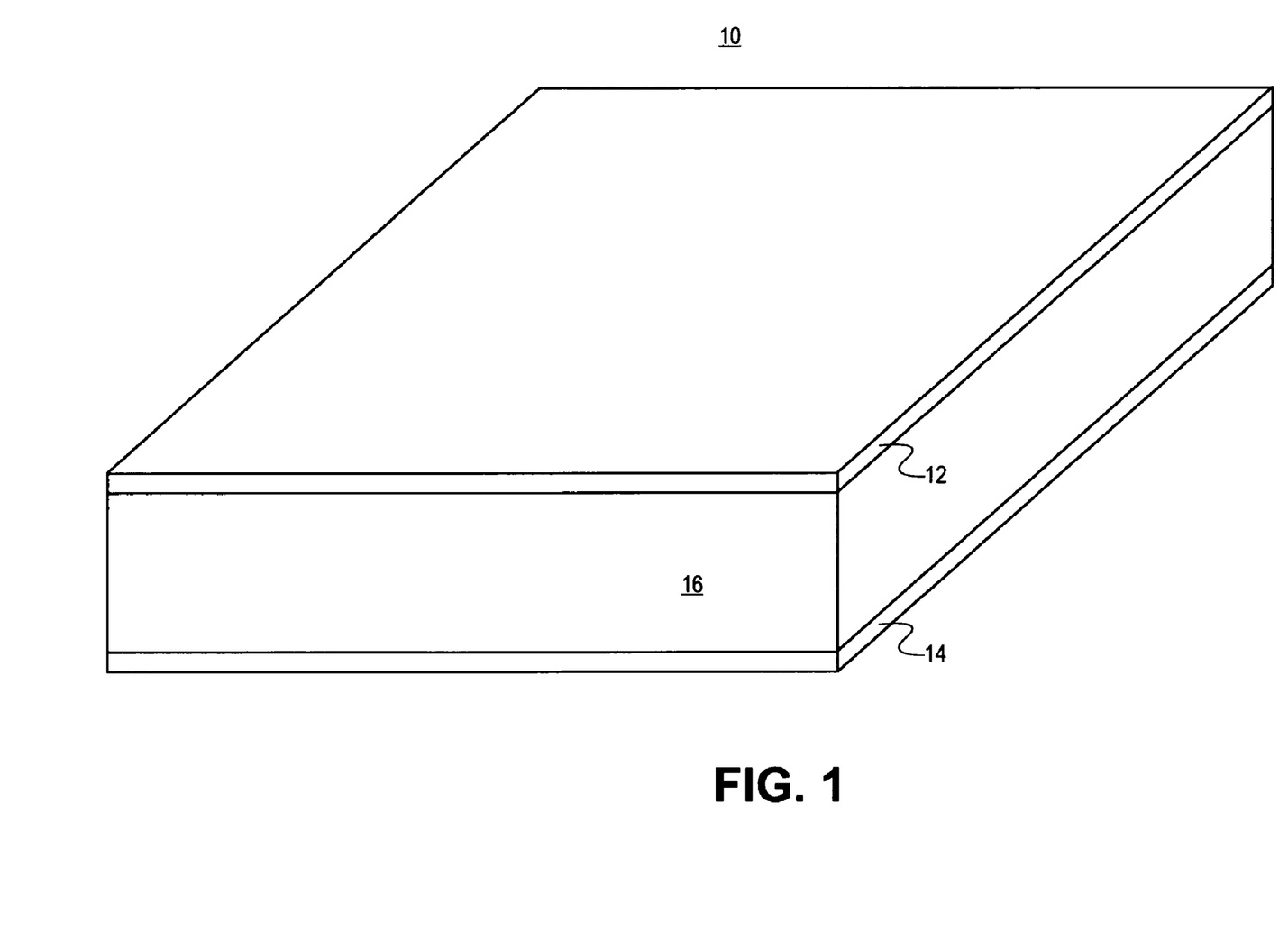
FIG. 1 is a perspective view of a panel suitable for use with various embodiments.

An embodiment will now be described with reference to the drawing figures, in which like reference numerals refer to like parts throughout. The FIG. 1, shows a panel 10 suitable for use with various embodiments. In general, the panel 10 includes any flat or curved material suitable for fabricating items. Particular examples of the panel 10 include composite foam core boards, hex cell composite panels also known as honeycomb core, and the like. The panel 10 includes a first skin 12, second skin 14, and core 16. The skins 12 and 14 are generally denser, stronger, more resistant to abrasion, and/or the like as compared to the core 16.

According to various embodiments, the skins 12 and 14 and the core 16 may include any suitable materials. In a particular example, suitable materials for the skins 12 and 14 include a polymer or other such plastic material. In other examples, the skins 12 and/or 14 may include metal foils, plastic films, fabric reinforced polymers, resins, and/or the like. Suitable materials for the core 16 include various foamed or honeycombed materials such as polymers, metals, ceramics, and the like.

The skins 12 and 14 are affixed to the core 16 and sandwich the core 16 therebetween to generate a structure that is relatively more rigid and durable than the individual components. In a particular example, plastic or polymer Skins 12 and 14 may be thermally or chemically affixed to the core 16. In other examples, resin pre-impregnated ("pre-preg") skins 12 and 14 may be affixed to the core 16 via a curing process such as heat of UV curing. In yet another example, uncured pre-preg may be affixed to the core 16 before, during or after creating the joint described herein. Regardless of the particular materials utilized, this composite structure is useful for fabricating items that are relatively strong, rigid, and/or light weight. These properties are particularly beneficial in items utilized in aerospace vehicles.

Figure 2:
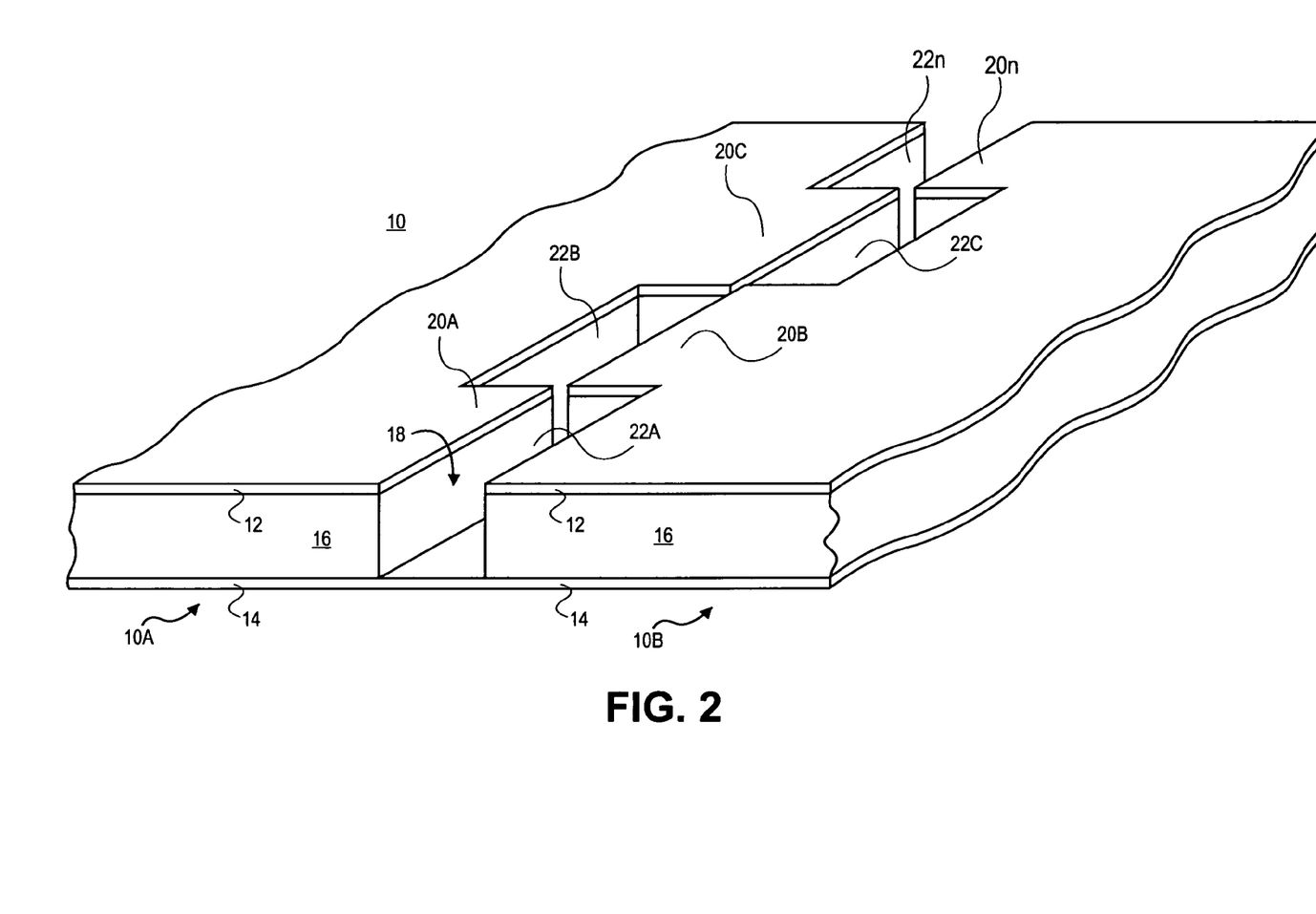
FIG. 2 is a perspective view of the panel that includes a groove suitable for use in an embodiment.

FIG. 2 is a perspective view of the panel 10 that includes a groove 18 suitable for use in an embodiment. As shown in FIG. 2, the groove 18 bifurcates or delineates the panel 10 into a first portion or first sub panel 10A and a second portion or second sub panel 10B. The groove 18 is shown to extend through the skin 12 and core 16, stopping at the skin 14. However, it is to be understood that the depth of the groove 18 may depend upon a variety of factors such as, for example, angle of the fully engaged joint, thickness of the panel 10, etc. and thus, the depth of the groove is not critical to the embodiments.

The groove 18 includes a set of tabs 20A to 20n and a set of slots 22A to 22n. The set of tabs 20A to 20n are disposed along the groove 18. Ones of the tabs alternate between a first side of the groove and a second side of the groove. For example, the tab 20A is disposed on the first side of the groove 18 and the tab 20B is disposed on the second side of the groove 18. Similarly, the set of slots 22A to 22n are disposed along the groove 18 with ones of the slots alternating between the second side of the groove and the first side of the groove 18.

Figure 3:
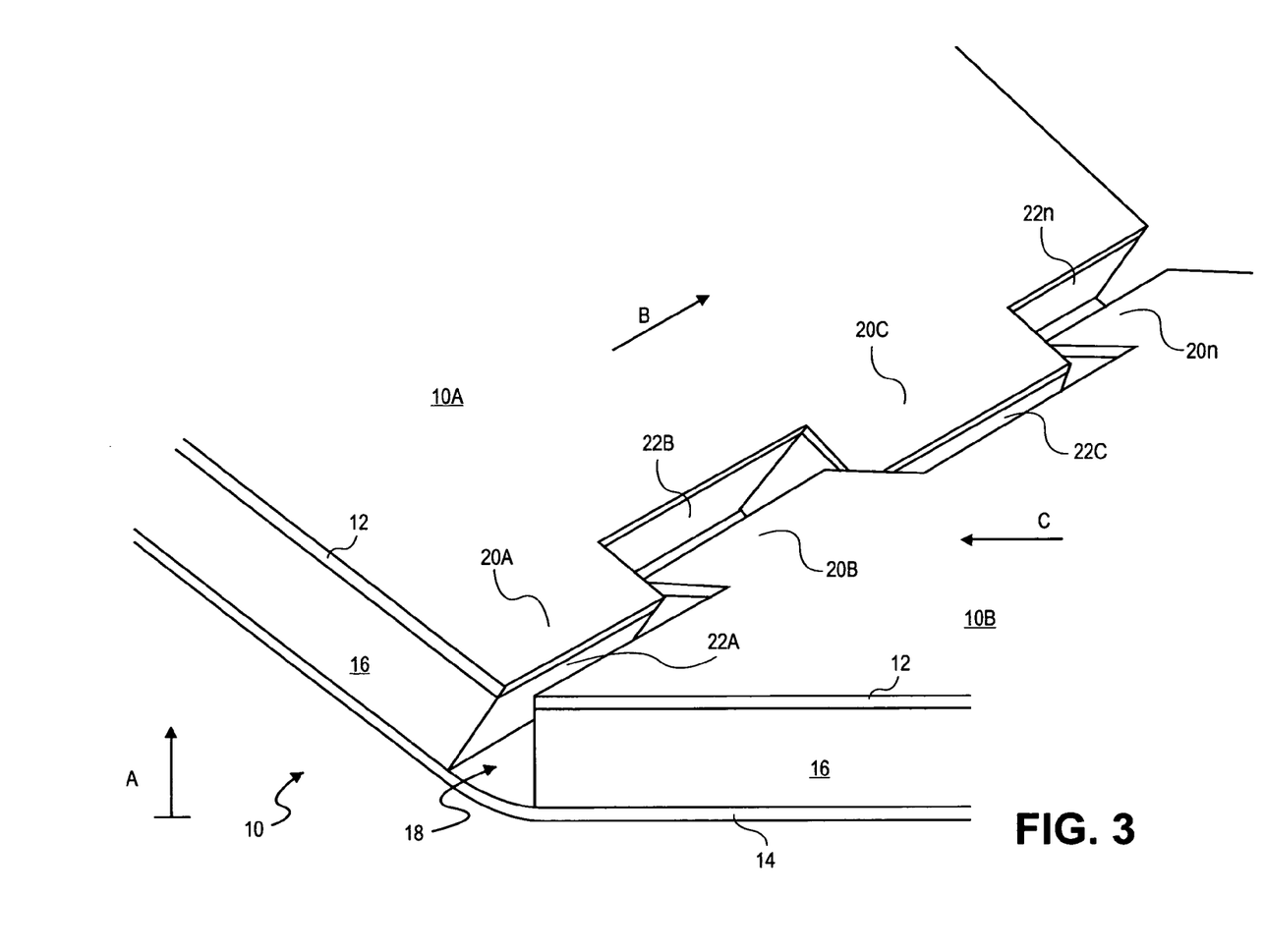
FIG. 3 is a perspective view of the panel at an intermediate stage during the formation of a joint.

FIG. 3 is a perspective view of the panel 10 at an intermediate stage during the formation of a joint. As shown in FIG. 3, as the panel 10 is bent along the groove 18, the set of tabs 20A to 20n are mated with the set of slots 22A to 22n. That is, the set of tabs from one side of the groove 18 (i.e., tabs 20A and 20C) intermesh with the set of tabs from the other side of the groove 18 (i.e., tabs 20B and 20n) in a manner similar to the meshing of gear teeth or the "zipping" of a zipper. In a particular example, the sub panel 10A is rotated in direction A relative to the sub panel 10B. The intact skin 14 serves as a hinge or pivot point. In this regard, the skin 14 is flexible or malleable at least to some extent. While the skin 12 may also be flexible or malleable, it need not be and may include relatively inflexible, hard, and/or brittle materials.

Figure 4:
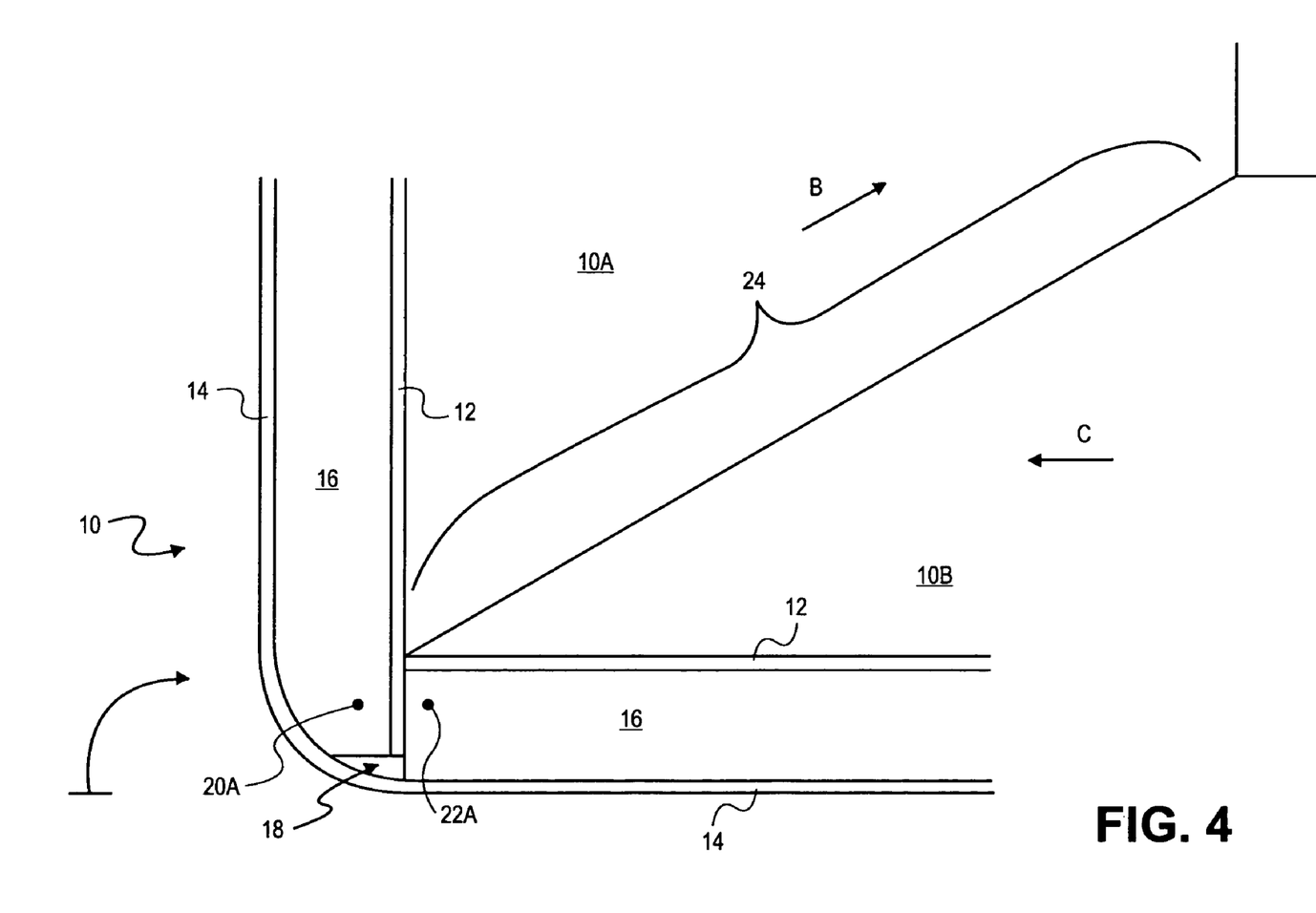
FIG. 4 is a perspective view of a joint generated in the panel.

The meshing of the set of tabs 20A to 20n and/or the set of slots 22A to 22n abuts several faces of the set of tabs 20A to 20n and the set of slots 22A to 22n together to facilitate a transfer of load or shear forces from the sub panel 10A to the sub panel 10. For example, in FIG. 3, the sides of the tabs 20A to 20n are shown in contact as the tabs 20A to 20n are inserted into the respective slots 22A to 22n. Thus, even at this intermediate stage, the intermeshing of the set of tabs 20A to 20n stabilizes the joint and transfers shear or load across the joint. For example, urging the sub panel 10a in direction B generates shear along the groove 18. The intermeshed tabs 20A to 20n transfer this shear across the groove 18 and into the sub panel 10B. In the fully engaged joint as shown in FIG. 4, the upper faces of the set of tabs 20A to 20n abut the edges of the set of slots 22A to 22n. These abutting faces transmit tension load or shear load exerted in direction C across the joint.

FIG. 4 is a perspective view of a joint 24 generated in the panel 10. As shown in FIG. 4, the volume previously occupied by the groove 18 is largely or completely subsumed within the joint 24. That is, the geometry of the joint displaces volume that might otherwise be occupied with glue or adhesive. In this manner, added weight from excess glue or adhesive may be minimized the joint 24. In addition to the sides of the tabs 20A to 20n abutting, the top faces of the tabs 20A to 20n abut the ends of the slots 22A to 22n. These abutting faces facilitate a transfer of shear load or tension load at least in directions B and C and twisting loads across the joint 24. As a result, the joint 24 may be fabricated without the use of glue. It is an advantage of some embodiments that this "glueless" joint may, in some circumstances, eliminate the added weight or cost of glue.

Figure 5:
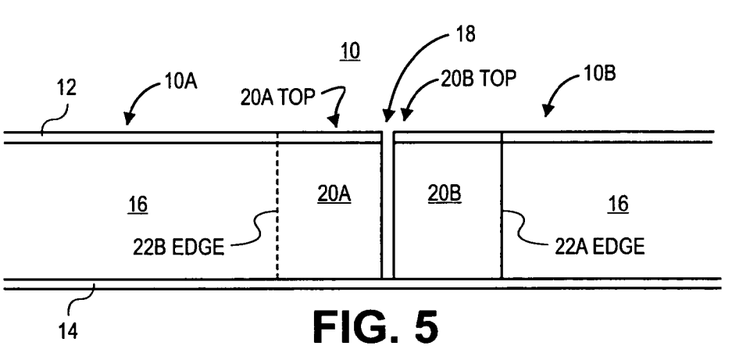
FIG. 5 is a side view with hidden lines of the panel at a first stage in the fabrication of the joint.
Figure 6:
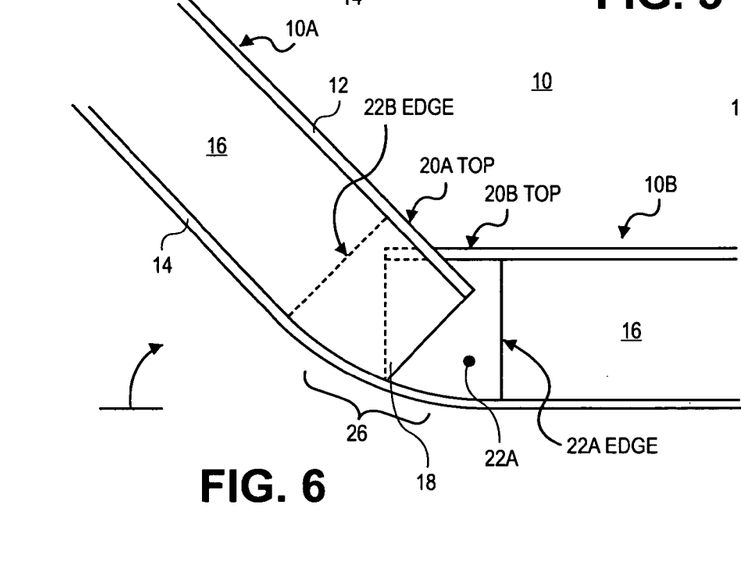
FIG. 6 is a side view with hidden lines of the panel at a second stage in the fabrication of the joint.
Figure 7:
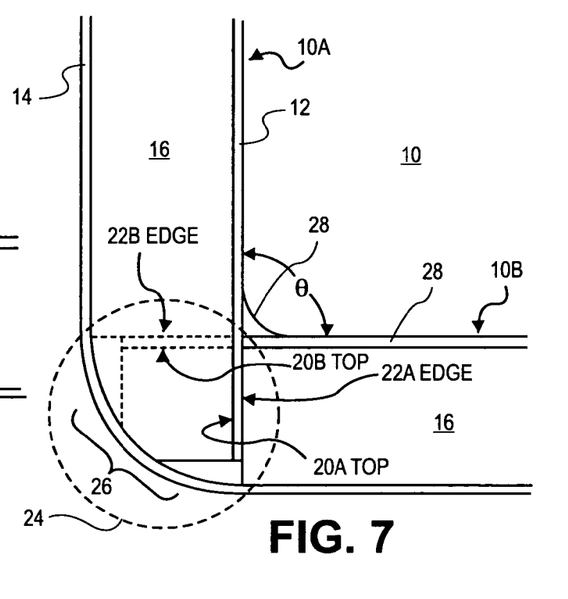
FIG. 7 is a side view with hidden lines of the panel at a third stage in the fabrication of the joint.

FIGS. 5 to 7 are side views with hidden lines at various stages during the fabrication of the joint 24. The set of tabs 20A to 20n include respective top faces $20A_{top}$ to $20n_{top}$. Specifically shown in FIG. 5, the tabs 20A and 20B include respective top faces $20A_{top}$ to $20B_{top}$. The set of slots 22A to 22n include respective edge faces $22A_{edge}$ to $22n_{edge}$. Specifically shown in FIG. 5, the slots 22A and 22B include respective edge faces $22A_{edge}$ to $22B_{edge}$. In an intermediate stage as shown in FIG. 6, the sub panel 10A is bent relative to the sub panel 10B at the groove 18.

Also shown in FIG. 6, a compressed area 26 is generated along the outside of the joint 24 (shown in FIG. 7). This compressed area 26 is optionally formed based on a variety of factors such as, for example, material characteristics of the core 16, dimensions of the groove 18, and the like. In the particular example shown, tension in the skin 14 as the skin 14 is pulled around the outside of the joint 24 presses into the core 16. This pressure tends to generate a radius or "round over" the edge of the joint 24.

In FIG. 7, the fully engaged joint 24 is shown. When the joint 24 is fully engaged, the skin 12 or inside surfaces of the jointed panel intersect at angle θ. Stated in another manner, a first plane defined by the sub panel 10A intersects a second plane defined by the sub panel 10B at the angle θ. The angle θ may be modulated in response to varying the dimensions of the groove 18. Particular examples of modulating the angle θ by varying the dimensions of the groove 18 are shown in FIGS. 8 to 11.

The joint 24 optionally includes a fillet 28 to improve the appearance of the joint 24 and/or to increase the strength of the joint 24. If included, the fillet 28 may be curved to blend the skin 12 of sub panel 10A to the skin 12 of sub panel 10B. To further increase the strength of the joint 24, a relatively small amount of glue, adhesive, or bonding agent may be applied to one or more intermeshing surfaces of the joint 24. For example, a coating of adhesive may be applied to the top faces $20A_{top}$ to $20n_{top}$ prior to full engagement of the joint 24. Upon full engagement, the adhesive may bind the $20A_{top}$ to $20n_{top}$ to the respective edge faces $22A_{edge}$ to $22n_{edge}$. It is an advantage of various embodiments that relatively less adhesive may be utilized as compared to conventional joining methods. It is a further advantage that in some situations, for example if the joint 24 is stabilized, adhesive may be omitted. This may further reduce the weight, cost, and/or associated cost of fabricating the joint 24 and thus, an item fabricated with the joint 24.

Figures 8, 9, 10, 11:
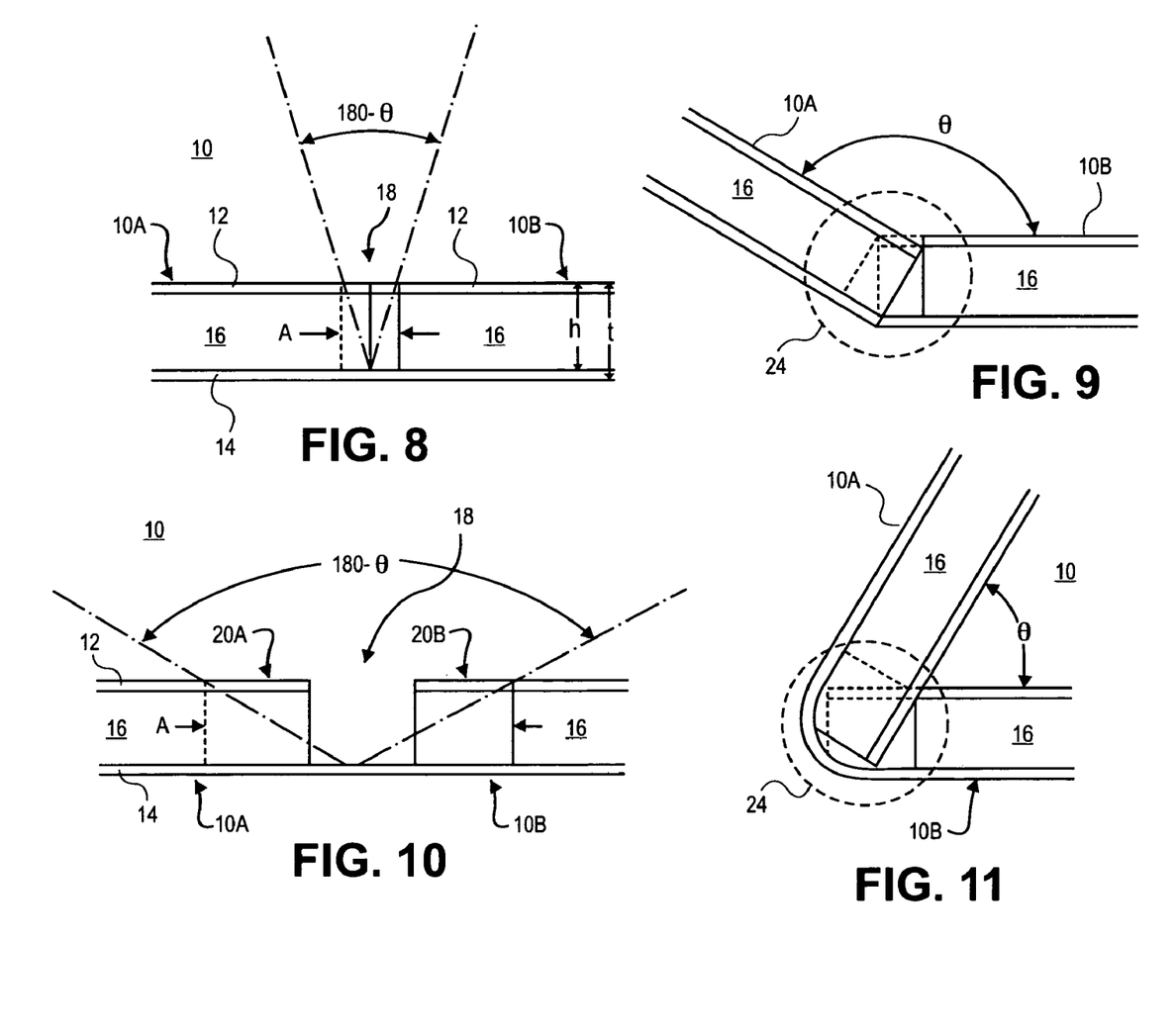
FIG. 8 is a side view with hidden lines of the panel at a first stage in the fabrication of the joint having an angle of θ=30°.
FIG. 9 is a side view with hidden lines of the fully engaged joint having an angle of θ=30°.
FIG. 10 is a hidden line view of the panel with the groove suitable for fabricating the joint having an angle of θ=120°.
FIG. 11 is a hidden line view of the panel with the fully engaged joint having an angle of θ=120°.

FIGS. 8-11 show specific examples of the joint 24 being fabricated at angles other than 90°. In particular, FIG. 8 is a side view of the panel 10 with the groove 18 suitable for fabricating the joint 24 having an angle of θ=120°. The groove 18 includes a width (A) generally corresponding to the formula: A=h×tan(180−θ). Where h=a height of the core 16 plus the skin 12. In another example, the groove width generally corresponds to the formula: A=π(t)(180−θ)/180. Where t=the thickness of the panel 10. As shown in FIG. 9, when fully engaged, the joint 24 includes an angle of 120°.

FIG. 10 is a side view of the panel 10 with the groove 18 suitable for fabricating the joint 24 having an angle of θ=30°. Of note, the tabs 20A to 20n occupy relatively less of the groove 18 than in the joint 24 having a relatively larger angle θ. This "tab length to joint angle" relationship depends on a variety of factors such as, for example, core height, core resiliency, empirical data, and the like. It is to be understood that while specific examples of the joint 24 having an angle of θ=30°, 90°, and 120° have been shown. The various embodiments are not limited to the joint 24 having an angle of θ=30°, 90°, and 120° but rather, any suitable joint angle may be made according to the various embodiments. In some "high speed" production facilities utilizing ½" panels and standard milling devices and bits, the range of joint angle may be about 40° to about 135°. However, utilizing thicker or thinner panels and/or narrower or tapered milling bits may facilitate production of joint angles of less than 30° and greater than 135°.

Figure 12:
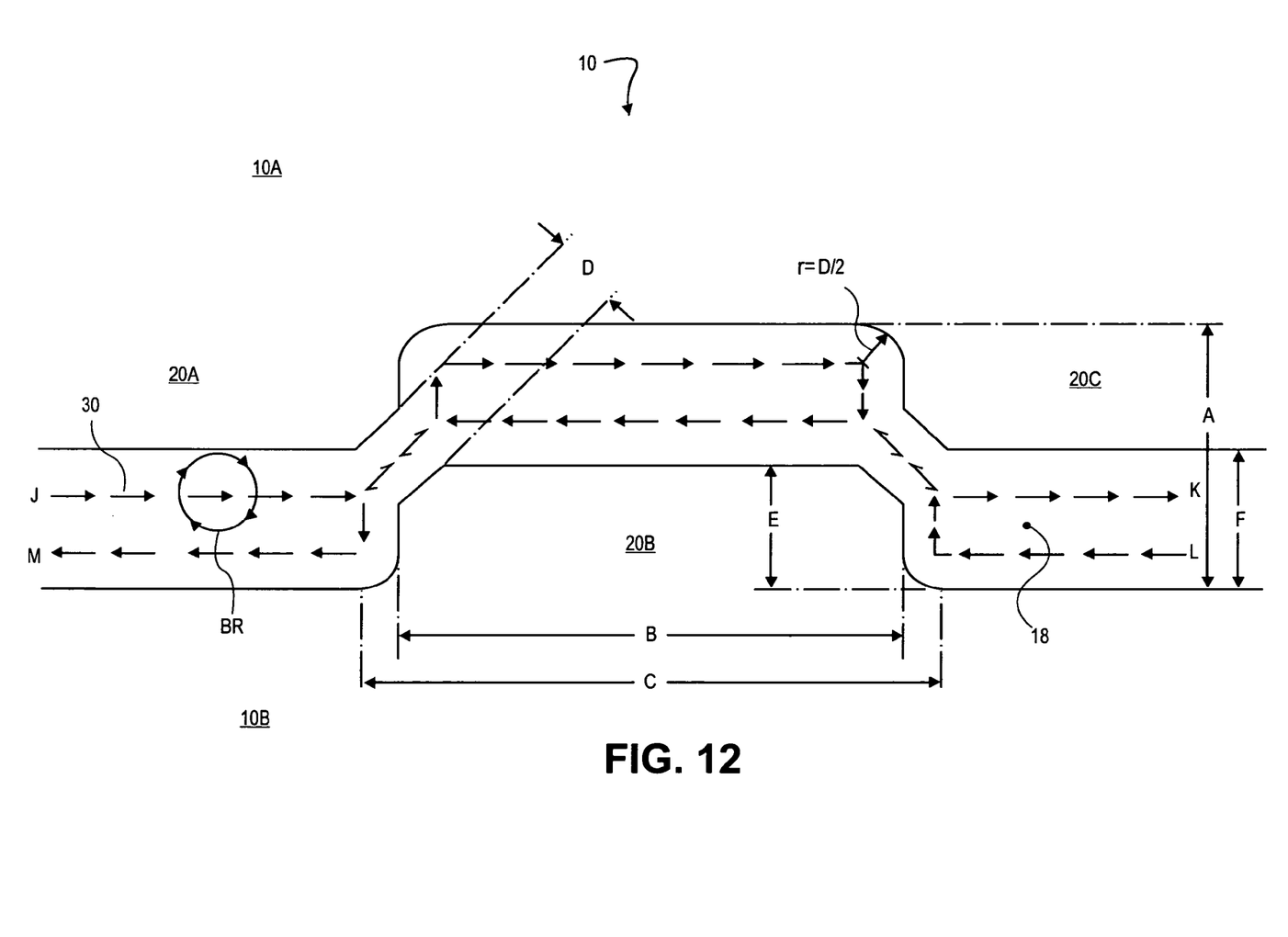
FIG. 12 is a plan view of the groove in the panel according to an embodiment.

FIG. 12 is a plan view of the groove 18 in the panel 10 according to an embodiment. As shown in FIG. 12, the groove 18 includes the width "A" described in FIG. 8, tab width at top "B", tab width at base "C", a bypass width "D", tab height "E", and tab overlap "F". The bypass width "D" may vary according to the diameter of the bit utilized to mill the groove 18. In a particular example, using a ½" diameter bit to mill the groove, the bypass width "D" may be greater than or equal to ½". According to various embodiments, the tab height "E" may be about ⅓ the width "A" and/or less than or equal to the panel thickness "t".

In addition, a bit path 30 suitable for use according to an embodiment is shown in FIG. 12. More particularly, the bit path 30 is shown to progress from point "J" to point "K" and from point "L" to point "M". Generally, the "feed direction" of a rotating bit is against the bit's rotation. Thus, for a bit rotation BR, the feed direction may be as indicated in FIG. 12. However, depending upon the rotational direction of the bit utilized to generate the groove 18, the bit path 30 may be followed as shown or may proceed in an opposite direction.

Figures 13, 14:
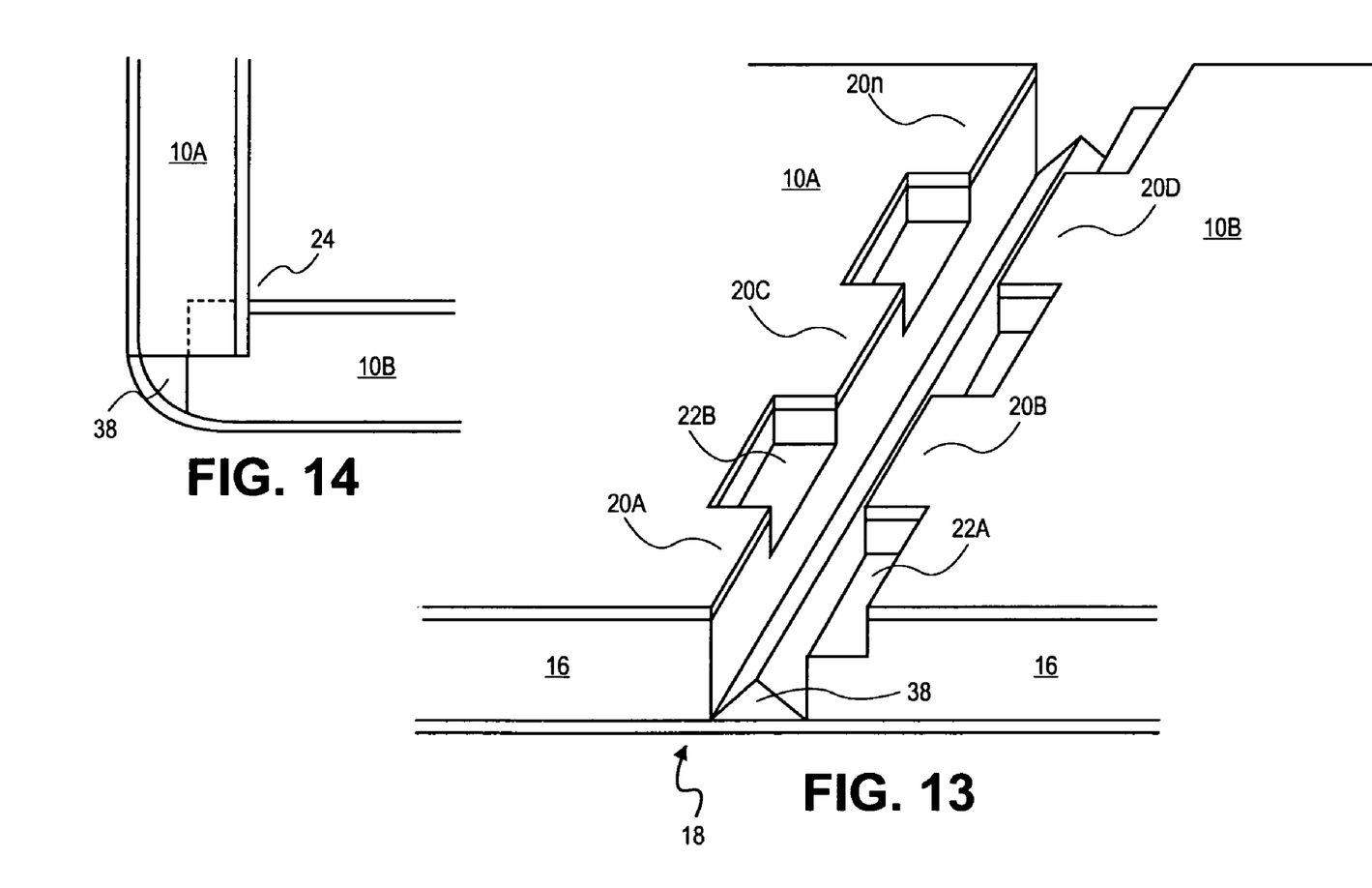
FIG. 13 is a perspective view of the panel that includes a groove suitable for use in another embodiment.
FIG. 14 is a side view with hidden lines of the fully engaged joint according to FIG. 13.

FIGS. 13 and 14 show the joint 24 according to another embodiment. In particular, FIG. 13 is a perspective view showing the groove 18. As shown in FIG. 13, the groove 18 includes an optional spline 38. If included, the spline 38 may reduce "dead space" in the fully engaged joint 24. In addition, the slots 22a to 22n may be less than the full depth of the groove 18. FIG. 14 is a hidden line view of the side of the fully engaged joint 24. As shown in FIG. 14, there is essentially no void or air space in the joint 24. In addition, it is an advantage of the joint 24 according to the embodiment of FIGS. 13 and 14 that the core 16 may not be compressed during fabrication of the joint. Thus, the joint 24 may be suitable for use with relatively hard, inflexible, or brittle cored panels.

Figure 15:
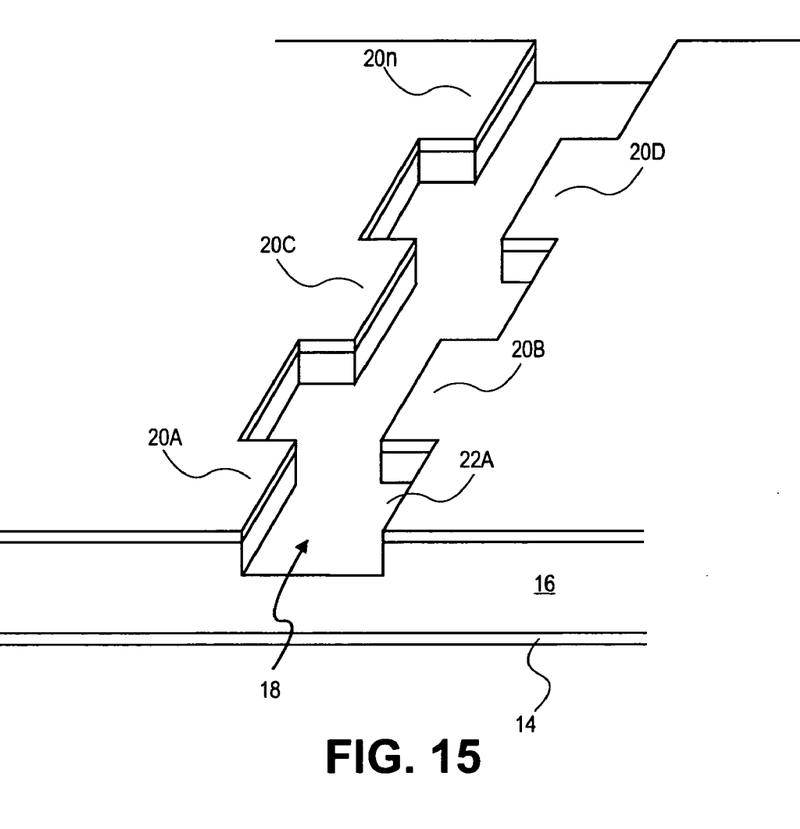
FIG. 15 is a perspective view of the panel that includes a groove suitable for use in yet another embodiment.
Figure 16:
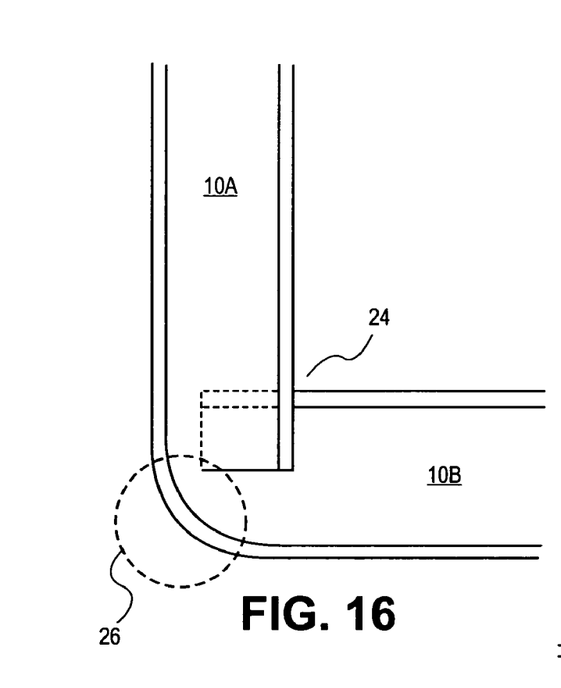
FIG. 16 is a side view with hidden lines of the fully engaged joint according to FIG. 15.

FIGS. 15 and 16 show the joint 24 according to another embodiment. In particular, FIG. 15 is a perspective view showing the groove 18. As shown in FIG. 15, the groove 18 may be less than the full depth of the core 16. As such, the joint 24 may retain a greater portion of the original strength of the panel 10. FIG. 16 is a side view with hidden lines of the fully engaged joint 24. As shown in FIG. 16, the joint 24 includes the compressed area 26.

Figures 17, 18:
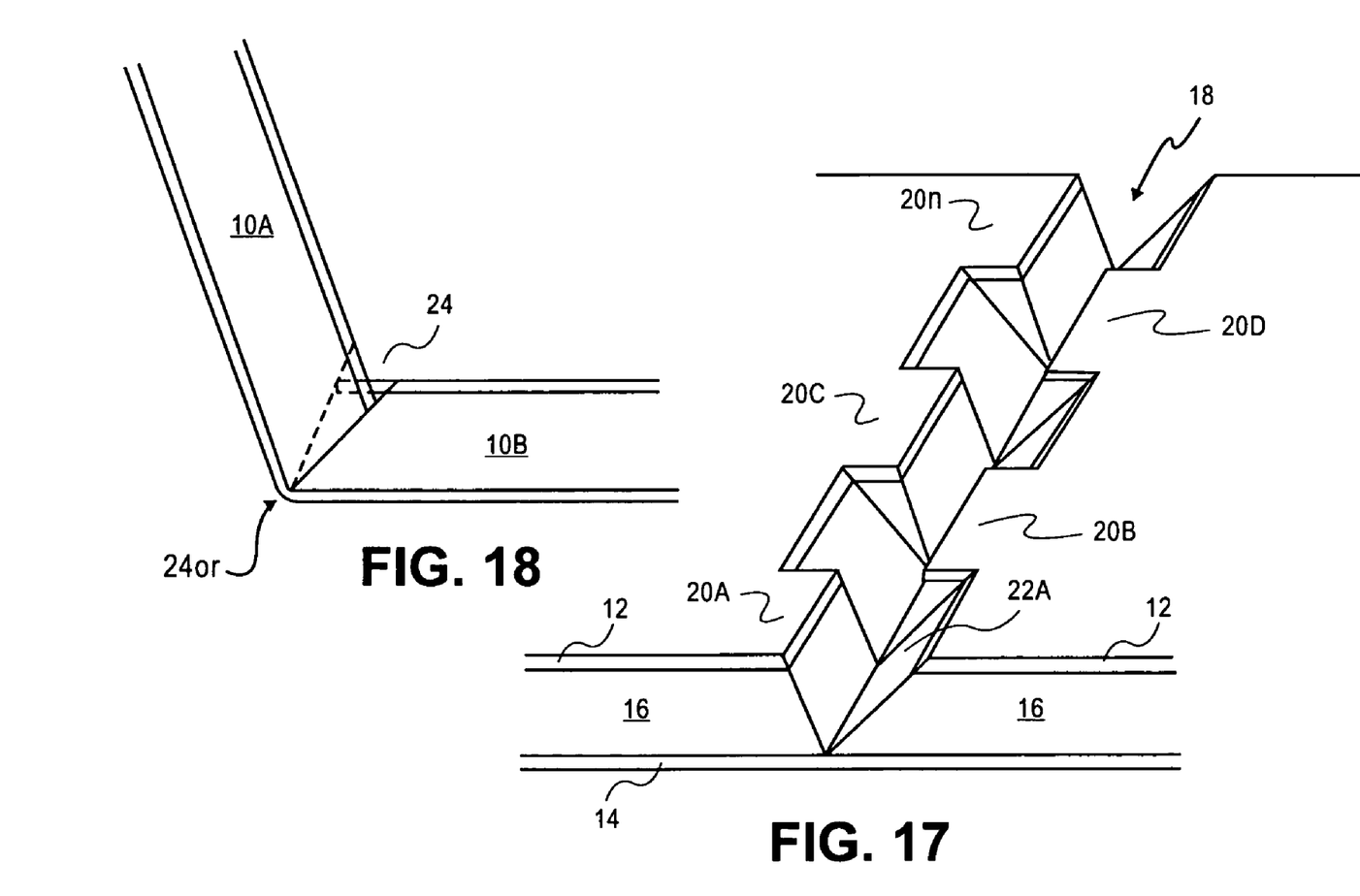
FIG. 17 is a perspective view of the panel that includes a groove suitable for use in yet another embodiment.
FIG. 18 is a side view with hidden lines of the fully engaged joint according to FIG. 17.

FIGS. 17 and 18 show the joint 24 according to yet another embodiment. In FIG. 17, the groove 18 is shown to taper from a relatively wide portion at the skin 12 to a relatively narrower portion at the groove 18 approaches the skin 14. It is an advantage of this embodiment that an outer radius of the joint 24 (24 or) may be relatively small as compared to other embodiments. It is another advantage of this embodiment that little or no appreciable compression of the core 16 takes place while forming the joint 24. As such, the core 16 may include substantially rigid or incompressible material. FIG. 18 is a side view with hidden lines of the fully engaged joint 24. As shown in FIG. 18, the joint 24 includes the joint outer radius 24 or is relatively small in comparison other embodiments.

Figure 19:
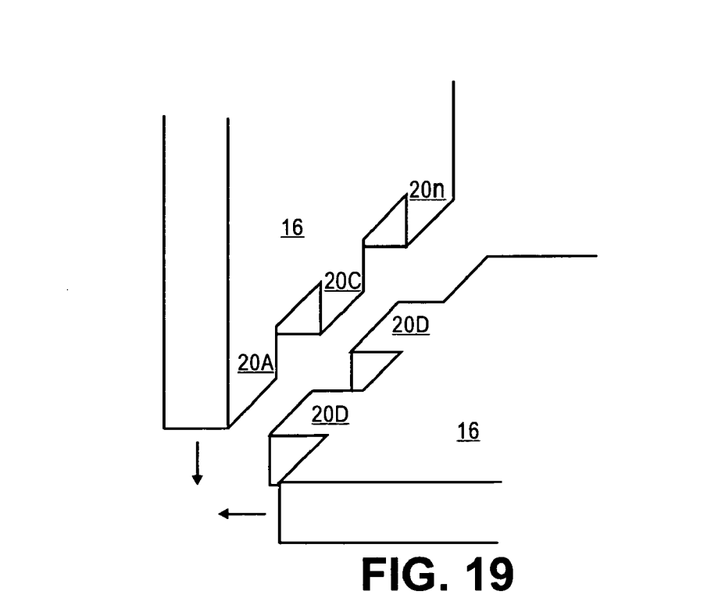
FIG. 19 is a perspective view of a core that includes a set of tabs and a set of slots suitable for use in yet another embodiment.
Figure 20:
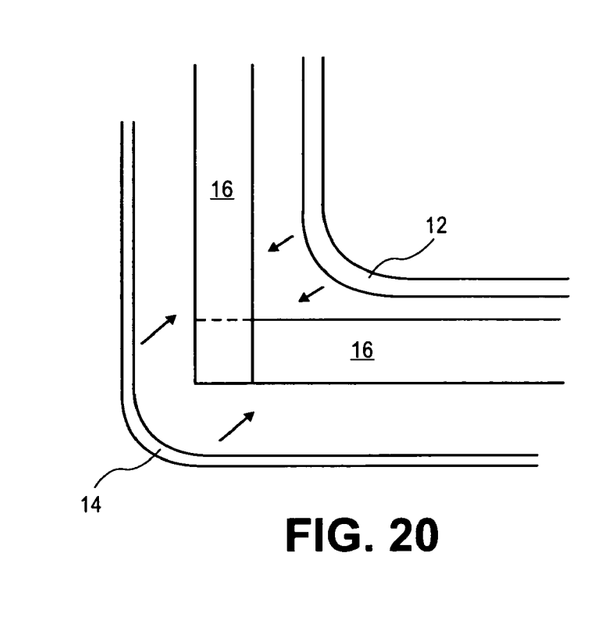
FIG. 20 is a side view with hidden lines of the fully engaged joint according to FIG. 19.
Figure 21:
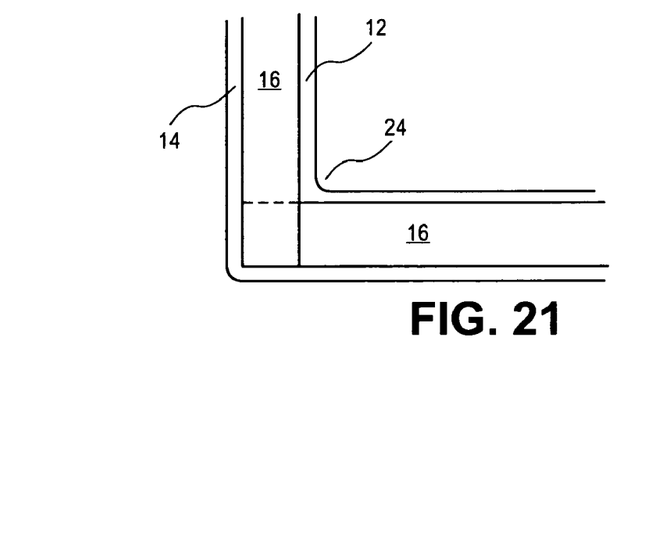
FIG. 21 is a side view with hidden lines of the fully engaged joint with affixed skins according to FIGS. 19 and 20.

FIGS. 19-21 show the joint 24 according to yet another embodiment. As shown in FIG. 19, the core 16 is milled or otherwise formed to create the tabs 20A-20n and these tabs 20-20n are interlaced. As shown in FIG. 20, the skins 12 and 14 are applied to the core 16. As shown in FIG. 21, the skins 12 and 14 are affixed or cured to the core 16. In this manner, the joint 24 may be formed seamlessly. That is, the skins 12 and 14 may be uncut and therefore may be structurally stronger.

Figure 22:
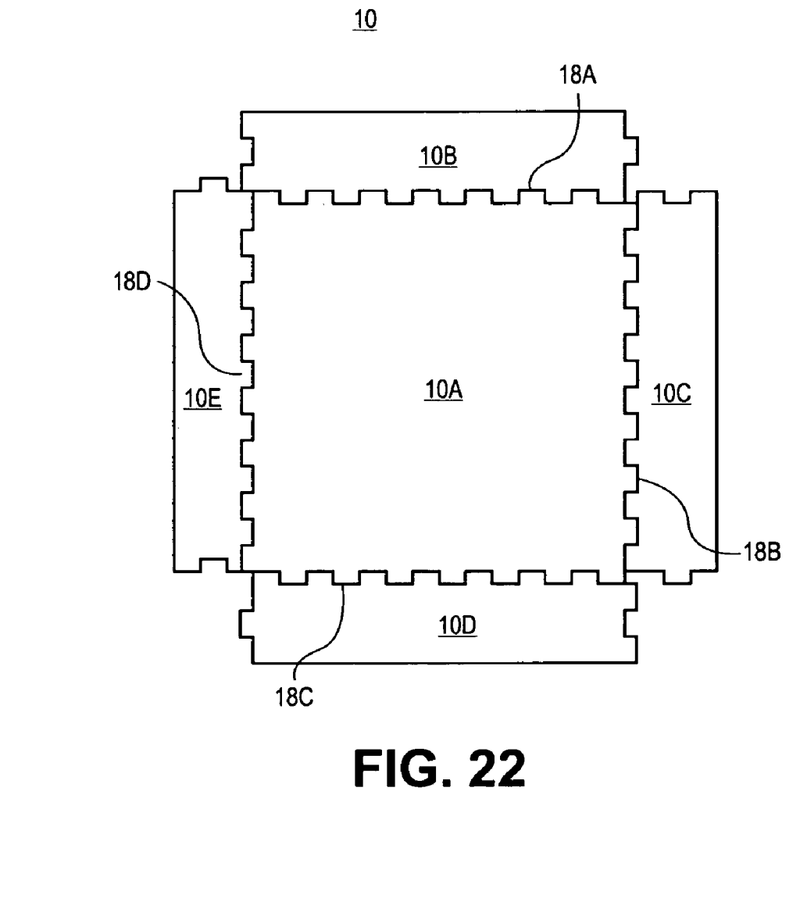
FIG. 22 is a plan view of a pre-cut and pre-grooved panel blank suitable for use according to an embodiment.

FIG. 22 is a plan view of a pre-cut and pre-grooved panel blank suitable for use according to an embodiment. As shown in FIG. 22, the panel 10 includes sub panels 10A to 10E and grooves 18A to 18D.

Figure 23:
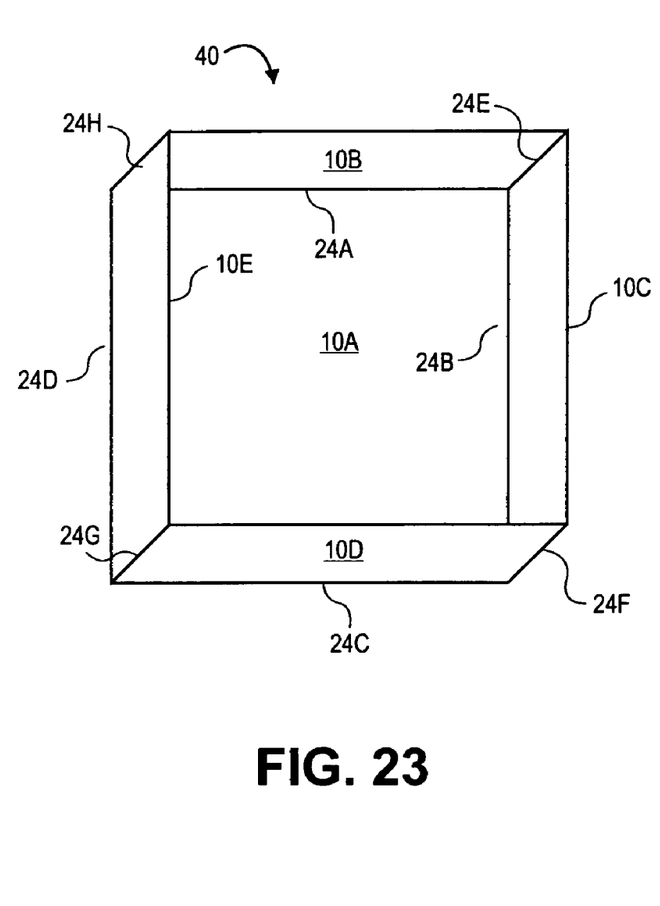
FIG. 23 is a perspective view of an item in accordance to an embodiment.

FIG. 23 is a perspective view of an item 40. The item 40 includes joints 24A to 24H. Depending upon the materials utilized and anticipated loads the item 40 may be subjected to, the joints 24A to 24H may be fabricated according to any embodiment disclosed herein. According to a particular embodiment, the joints 24A to 24D may be fabricated without adhesive due to the stabilizing effects of the joints 24E to 24H. That is, the joints 24E to 24H retain the sub panels 10B to 10E in their relative positions with respect to each other and with respect to the sub panel 10A. The joints 24A to 24D transfer shear throughout the item 40 and are essentially as strong as glued conventional joints. However, due to the reduction or elimination of glue in the item 40, the item 40 is significantly lighter than a conventionally joined item. Therefore, the item 40 is particularly advantageous when utilized in weight-sensitive applications such as aerospace vehicles, and the like.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A method of fabricating a joint in a panel, the method comprising the steps of:
    fabricating a groove in the panel, the panel comprising a first skin, a second skin, and a core, the core being sandwiched between the first skin and the second skin, the groove passing through the first skin and at least a portion of the core and not passing through the second skin, the groove comprising a set of tabs and a corresponding set of slots;
    bending the panel along the groove; and
    intermeshing the set of tabs with the set of slots in response to bending the panel along the groove.

2. The method according to claim 1, further comprising the step of:
    calculating a groove width according to an equation:

$$A=\pi(t)(180-\theta)/180$$

A comprising the groove width;
    $\theta$ comprising an angle of the joint; and
    t comprising a thickness of the panel.

3. The method according to claim 1, further comprising the step of:
    calculating a groove width according to an equation:

$$A=h*\tan(180-\theta)$$

A comprising the groove width;
    h comprising a height of the core plus the first skin; and
    $\theta$ comprising an angle of the joint.

4. The method according to claim 1, further comprising the step of:
    fabricating a tab of the set of tabs, the tab having a tab length, tab height, and tab depth, the tab length corresponding to a distance along the axis of the groove, the tab height corresponding to a distance perpendicular to the axis of the groove and in the plane of the panel, the tab depth corresponding to a distance perpendicular to the axis of the groove and perpendicular to the plane of the panel.

5. The method according to claim 4, wherein the tab height is less than the tab depth.

6. The method according to claim 4, wherein the tab length is less than ½ a length of the groove.

7. The method according to claim 4, wherein the tab height is based on the angle at the joint.

8. The method according to claim 1, further comprising the step of:
    cutting the groove in the panel with a rotating bit.

9. The method according to claim 1, further comprising the step of:
    cutting the groove in the panel with a blade.

10. A method of fabricating an item for an aerospace vehicle, the method comprising the steps of:
    fabricating a first joint in a panel including:
        fabricating a groove in the panel, the panel comprising a first skin, second skin, and core, the core being sandwiched between the first skin and the second skin, the groove passing through the first skin and at least a portion of the core and not passing through the second skin, the groove comprising a set of tabs and a corresponding set of slots, and the groove delineating a first portion of the panel from a second portion of the panel;
        bending the panel along the groove such that the first portion and the second portion intersect at an angle at the groove; and
        intermeshing the set of tabs with the set of slots in response to bending the panel along the groove; and
    fabricating a second joint such that the second joint substantially retains the angle of the first joint.

11. The method according to claim 10, further comprising the steps of:
    fabricating a groove length corresponding to a distance of the groove along a plane of the panel; and
    fabricating a groove width corresponding to a distance perpendicular to an axis of the groove and parallel to the plane of the panel.

12. The method according to claim 11, wherein the groove width is based on an angle at the joint.

13. The method according to claim 10, further comprising the step of:
    fabricating a tab of the set of tabs, the tab having a tab length, tab height, and tab depth, the tab length corresponding to a distance along the axis of the groove, the tab height corresponding to a distance perpendicular to the axis of the groove and in the plane of the panel, the tab depth corresponding to a distance perpendicular to the axis of the groove and perpendicular to the plane of the panel.

14. The method according to claim 13, wherein the tab height is less than the tab depth.

15. The method according to claim 13, wherein the tab height is based on the angle at the joint.

16. The method according to claim 10, further comprising the step of:

cutting the groove in the panel with a rotating bit.

17. The method according to claim 10, further comprising the step of:

cutting the groove in the panel with a blade.

18. The method according to claim 10, further comprising the step of:

fabricating a third joint such that the first joint is disposed between the second joint and the third joint to substantially retain the angle of the first joint.

19. A method of fabricating a joint in a panel of an aerospace vehicle, the method comprising the steps of:

fabricating a groove in the panel, the panel comprising a first skin, a second skin, and a core, the core being sandwiched between the first skin and the second skin, the groove passing through the first skin and at least a portion of the core and not passing through the second skin, the groove comprising a set of tabs and a corresponding set of slots;

forming a spline in the groove;

bending the panel along the groove;

intermeshing the set of tabs with the set of slots in response to bending the panel along the groove; and calculating a groove width according to at least one of the following equations:

$$A = \pi(t)(180-\theta)/180; \text{ and}$$

$$A = h*\tan(180-\theta);$$

A comprising the groove width;
θ comprising an angle of the joint;
t comprising a thickness of the panel; and
h comprising a height of the core plus the first skin.

* * * * *